(12) United States Patent
Fehr

(10) Patent No.: US 10,906,564 B2
(45) Date of Patent: Feb. 2, 2021

(54) THERMAL INSULATING ELEMENT AND METHOD FOR ASSEMBLING A THERMAL INSULATING ELEMENT ON AN INTERIOR SURFACE OF A RAIL VEHICLE

(71) Applicant: SSC SWISS SHIELDING CORPORATION AG, Goldach (CH)

(72) Inventor: Ernst Fehr, Rorschach (CH)

(73) Assignee: SSC Swiss Shielding Corporation AG, Goldach (CH)

( * ) Notice: Subject to any disclaimer, the term of this patent is extended or adjusted under 35 U.S.C. 154(b) by 679 days.

(21) Appl. No.: 15/313,292

(22) PCT Filed: May 22, 2015

(86) PCT No.: PCT/EP2015/061368
§ 371 (c)(1),
(2) Date: Nov. 22, 2016

(87) PCT Pub. No.: WO2015/177335
PCT Pub. Date: Nov. 26, 2015

(65) Prior Publication Data
US 2017/0203772 A1    Jul. 20, 2017

(30) Foreign Application Priority Data
May 23, 2014    (DE) .......................... 10 2014 107 290

(51) Int. Cl.
*B61D 17/18*    (2006.01)
*B60R 13/08*    (2006.01)
*B61D 1/00*    (2006.01)

(52) U.S. Cl.
CPC .......... *B61D 17/18* (2013.01); *B60R 13/0815* (2013.01); *B61D 1/00* (2013.01)

(58) Field of Classification Search
CPC .... B61D 17/18; B61D 17/12; B60R 13/0815; B60R 13/08
See application file for complete search history.

(56) References Cited

U.S. PATENT DOCUMENTS 3,985,198 A * 10/1976 Kurtze ................. E04B 1/8409
181/286
6,815,044 B2 * 11/2004 Boock ...................... B32B 3/30
181/293

(Continued)

FOREIGN PATENT DOCUMENTS

CN    203 211 315 U    9/2013
DE    89 00 165 U1     4/1989

(Continued)

OTHER PUBLICATIONS

PCT International Search Report for PCT/EP2015/061368, dated Aug. 21, 2015, 4 pages.

(Continued)

*Primary Examiner* — Scott A Browne
(74) *Attorney, Agent, or Firm* — Patterson Thuente Pedersen, P.A.

(57) ABSTRACT

The invention relates to a thermal insulating element for thermally insulating an interior of a rail vehicle. The insulating element is characterized in that the insulating element has a length, a width, and a thickness, is at least partly made of a closed-cell material, and has at least one expansion joint on the insulating element outer surface. The invention further relates to a method for assembling a thermal insulating element on an interior surface of a rail vehicle, said method having the steps of providing a thermal insulating element which has a length, a width, and a thickness and which is at least partly made of a closed-cell material and attaching the insulating element to an interior-side surface of the rail vehicle.

15 Claims, 2 Drawing Sheets

(56) References Cited

U.S. PATENT DOCUMENTS

| | | | | |
|---|---|---|---|---|
| 2011/0248117 A1* | 10/2011 | Boock | ........................ | B32B 3/12 |
| | | | | 244/1 N |
| 2012/0234979 A1* | 9/2012 | Smith | ........................ | B64C 1/40 |
| | | | | 244/158.1 |

FOREIGN PATENT DOCUMENTS

| | | | |
|---|---|---|---|
| DE | 89 11 726 U1 | | 12/1989 |
| DE | 295 11 622 U1 | | 8/1996 |
| DE | 195 09 676 A1 | | 9/1996 |
| DE | 202 01 828 U1 | | 5/2002 |
| JP | H11 20687 A | | 1/1999 |
| JP | H1120687 A | * | 1/1999 ............ B61D 17/18 |
| JP | 2001 071899 A | | 3/2001 |
| JP | 2006 123614 A | | 5/2006 |

OTHER PUBLICATIONS

English translation of PCT International Search Report for PCT/EP2015/061368, dated Aug. 21, 2015, 3 pages.
PCT Written Opinion of the International Searching Authority for PCT/EP2015/061368, dated Aug. 21, 2015, 8 pages.
DE Search Report for DE application No. 10 2014 107 290.1, dated Mar. 10, 2015, 6 pages.

* cited by examiner

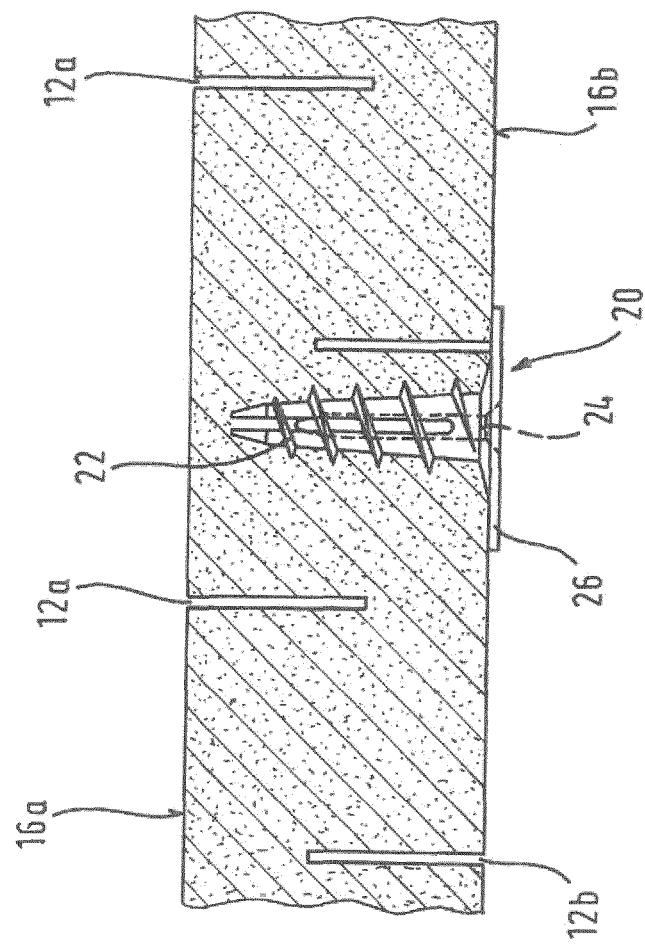

THERMAL INSULATING ELEMENT AND METHOD FOR ASSEMBLING A THERMAL INSULATING ELEMENT ON AN INTERIOR SURFACE OF A RAIL VEHICLE

RELATED APPLICATIONS

The present application is a National Phase entry of PCT Application No. PCT/EP2015/061368, filed on May 22, 2015, which claims priority to DE Patent Application No. 10 2014 107 290.1 filed on May 23, 2014, which are hereby fully incorporated herein by reference.

FIELD OF THE INVENTION

The invention relates to a thermal insulating element for thermally insulating an interior of a rail vehicle as well as a procedure for assembling a thermal insulating element on an interior surface of a rail vehicle.

BACKGROUND OF THE INVENTION

The drivers' cabins and passenger rooms are commonly insulated warm in order to ensure a comfortable climate for the people present there. Conventionally for example, mineral wool and glass-fiber mats that have been coated on one side with aluminum foil are used for the thermal insulation of rail vehicles. However, flexible foam on a melamine resin substrate is used for this purpose. All heat insulation materials simultaneously serve to dampen noise in order to minimize travel noise and general noise as much as possible. These thermal insulation materials are either self-adhesive or fastened by their own application of adhesive or mechanically fastened to the surface of the rail vehicle. All materials also fulfill the authoritative fire standards.

In particular, the more frequently used mineral wools and the melamine resin foam tend to absorb condensation, which form on the interior surface of the external skin of the rail vehicle due to temperature gradients present between the interior and the environment of the rail vehicle. The absorption of condensation, or other forms of moisture, can lead to these materials increasing in weight and slumping in partial areas, even within themselves. This can then lead to exposure of the external metal skin, so that heat insulation is no longer provided in these areas of the rail vehicle. The glass-fiber mats and flexible foams also used for heat insulation of the rail vehicles will absorb water to a certain degree and although these materials tend less to do so, they will slump with the absorption of moisture, which will lead to a reduction of the insulating capability and to an undesirable formation of bacteria in these insulating materials.

SUMMARY OF THE INVENTION

One task of this discovery consists of providing an improved and, in particular, equal thermal insulation for rail vehicles, which will eliminate disadvantages known from the state-of-the-technology, and for another thing, provide an assembly procedure, with whose assistance, permanent and equal insulation capability will be guaranteed for the thermal insulation.

This task is solved, on the one hand, through the thermal insulating element specified in claim 1 of the patent and, on the other hand, through the procedure specified in claim 20 of the patent. Preferable or optional characteristics of the discovery have been specified in the dependent claims 2 through 19 and 21 through 26 of the patent.

According to an initial aspect of the discovery, a thermal insulating element is provided for thermal insulation of the interiors of rail vehicles, which characterized in that it has a length, width and thickness, is at least partially made of closed-cell foam and has at least one expansion joint.

The expansion joint will preferably extend from one of the leading edges of the insulating element.

Furthermore, the expansion joint will preferably extend from the leading edge to a second edge of the insulating element.

According to a preferable form of execution of the discovery, the thermal insulating element will have a multitude of expansion joints on its external surfaces.

One preferable configuration of the discovery is present when at least one part of the expansion joint extends respectively beyond the entire length and/or width of the insulating element.

The expansion joints will preferably be arranged in a grid.

Arranging the expansion joints equidistant from each other is even more preferable.

Crossing the expansion joints is yet more preferable.

One additionally preferable form of executing the discovery will be present when one initial part of the expansion joints has been arranged on a leading external surface and a second part of the expansions joints has been arranged across a second external surface of the insulating element.

It will also be advantageous when the first part of the expansion joints and the second part of the expansion joints, which respectively extend in the same direction, have been arranged to offset each other.

The offset will preferably correspond to half of the distance to the neighboring expansion joint.

If at least one part of the expansion joints has a thickness that is greater than half of the thickness of the insulating element is even more preferable.

If the closed-cell material is a closed-cell polyethylene foam is yet more preferable.

If the closed-cell material is a physically networked closed-cell polyethylene foam is even more preferable than that.

According to an additionally preferred form of execution of the discovery, the thermal insulating element will furthermore include at least one fastening agent that is connected through force and/or shape and/or material with the closed-cell material.

The fastening material will preferable include a section anchored in the closed-cell material by means of force and/or shape and a disc that will be located in the space with the external surface.

The section will even more preferably include an anchor and a screw accepted by the anchor, whereby the disc will be fixed to the external surface by means of the screw.

One preferable form of execution of the discovery relates to a system that will include a multitude of thermal insulating elements, which will be cut to the interior geometry of the rail vehicle in line with the needs and labeled according to an assembly diagram.

The system will even more preferably include an adhesive and an assembly diagram.

According to a second aspect of the discovery, a procedure for assembling a thermal insulating element on an interior surface of a rail vehicle will be provided with the following steps:

Providing a thermal insulating element that has a length, a width and a thickness and is made at least partly of a closed-cell material, and Mounting the insulating element on an interior surface of the rail vehicle.

On one surface, the thermal insulating element will preferably have a drainage structure for water.

The drainage structure will even more preferably have a wave-shaped structure with a number of heights and depths.

One floor of the rail vehicle will yet more preferably be faced with the thermal insulating element.

According to a preferable form of execution of the second aspect of the discovery, the thermal insulating element will have at least one expansion joint at its external surface and the procedure will furthermore include the step of mounting at least one fastening agent on the insulating element such that it will be connected with the insulating element through force and/or shape and/or material and an open surface of the fastening agent will essentially be even with the external surface of the insulating element.

The procedure will preferably include the step of applying an adhesive to the open surface of the fastening agent.

A multitude of thermal insulating elements will even more preferably be provided for the procedure, which will have been constructed as previously described, whereby the procedure between the steps for the provision of thermal insulating elements and the application of the fastening agent to the insulating elements will cut the insulating elements to the interior geometry of the rail vehicle in line with the needs and labeled according to an assembly diagram.

BRIEF DESCRIPTION OF THE DRAWINGS

The discovery will only be described in a purely exemplary manner based on the preferred forms of execution of both aspect of the discovery with the addition of the attached figures, which will show.

DETAILED DESCRIPTION OF PREFERRED EMBODIMENTS

Figure 1:
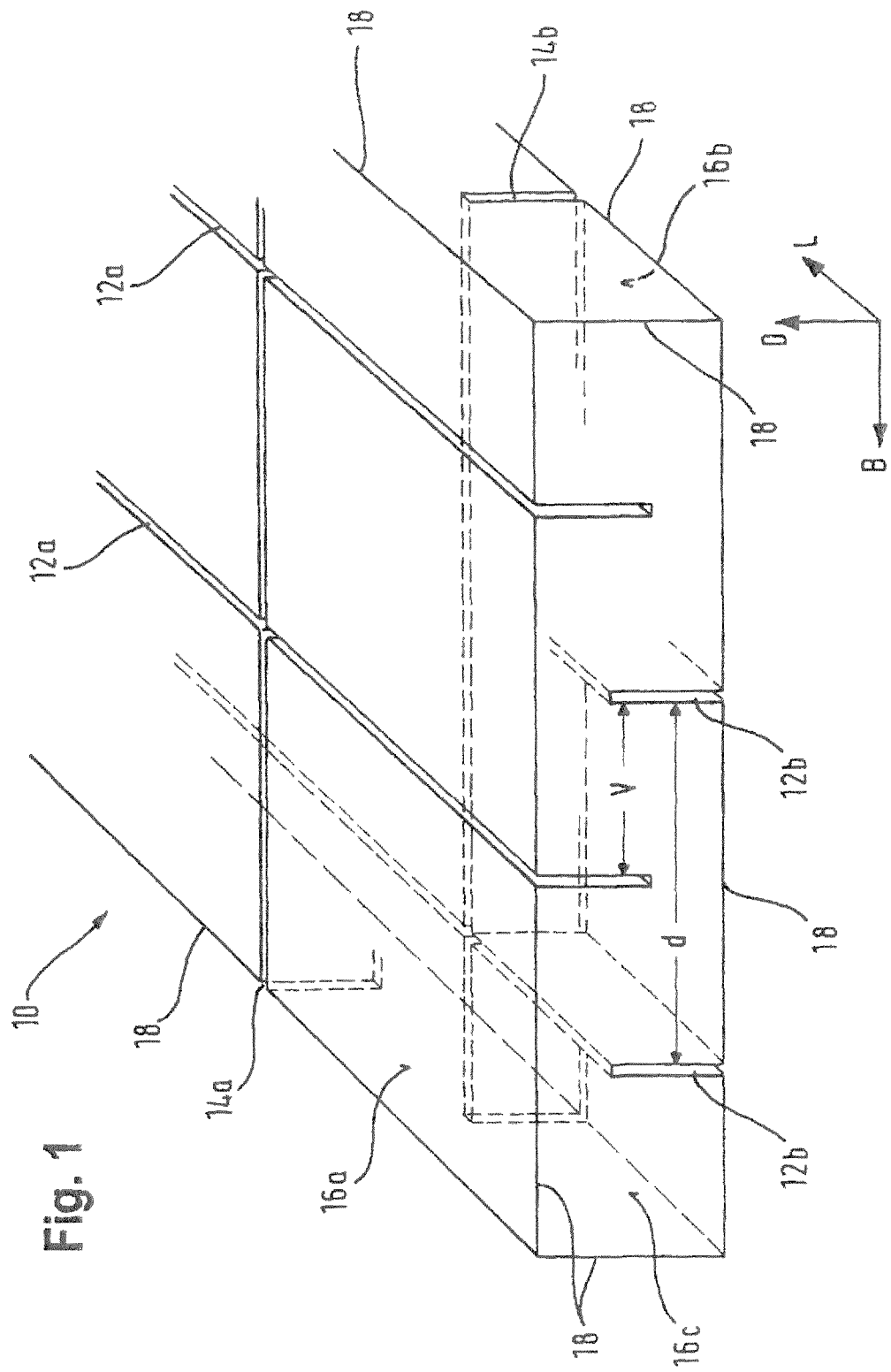
FIG. 1 a thermal insulating element according to one preferred form of execution of the discovery, and FIG. 2 the thermal insulating element depicted in FIG. 1 that is also intended for assembly of the insulating element on an interior surface of a rail vehicle using a fastening agent.

An initial aspect of the discovery relates to a thermal insulating element whose use as intended concerns the thermal interior insulation (floor and/or ceiling and/or wall) of a rail vehicle. So to say, this involves the thermal insulation of a rail vehicle interior. Although the thermal insulating element according to the discovery has been specially conceived for the ideal insulation of rail vehicles, the use the insulating element can conceivably also be used in the construction of airplanes, ships and rail-less vehicles, such as motor homes, buses, air-conditioned trailers and commercial vehicles.

Initially, the construction of the insulating element will be described according to a preferred form of execution for the first aspect of the discovery and then its assembly according to a preferred form of execution for the second aspect of the discovery will be explained. In conclusion, advantageous effects of both aspects of the discovery will be described.

The thermal insulating element, which can also serve as acoustic dampening material, can have any shape. Thus, square, rectangular, circular, polygonal, trapezoidal or taper shaped sheets, with or without variations in thickness, may enter into consideration. However, other shapes can also be conceived depending on the area of the interior to be insulated. All shapes entering into consideration can also include those that do not have clear or constant lengths, widths or thicknesses.

The measurements for the lengths, widths and thicknesses, L, B, D, have been depicted using a right-angle coordinate system for the thermal insulating element (10) using perspective and layer views in FIG. 1. The thermal insulating element (10) constructed here preferably as a sheet preferably has an even thickness (D), whereby the shape of the sheet preferably will be determined by the external edge 18. Depending on the location of use, the insulating element (10) can also have another shape and a variable thickness, as has already been mentioned previously. Such shapes can have additional external edges, such as at the transfer point between one area with a greater thickness and another area with a lesser thickness, although a clearly definable external edge is not present at such a transfer point, which can be circular.

The External Faces 16a and 16b of Insulating Element 10 do not have to be flush. External faces that have been constructed as convex or concave can also be conceived.

Insulating Element 10 depicted in FIG. 1 will preferably have a multitude of expansion joints, 12a, 12b, 14a and 14b. Expansion Joints 12a and 14a are intended for External Face 16a, while Expansion Joints 12b and 14b are intended for the opposing External Race 16b, which has been spaced by the Thickness D of Insulating Element 10 of External Face 16a. Expansion Joints 12a and 12b lie lengthwise along L of Insulating Element 10, while Expansion Joints 14a and 14b lie along Width B.

Expansion Joints 12a will preferably be parallel to each other, meaning arranged equidistant to each other. The same applies for Expansion Joints 12b on External Face 16b. Depending on the size of Insulating Element 10, additional Expansion Joints 14a and 14b may be intended as well along the width. The number of expansion joints, 12a, 12b, 14a and 14b, is therefore not limited to the number depicted in FIG. 1.

Expansion Joints 12a and 14a will preferably be across from each other. The same applies preferably for Expansion Joints 12b and 14b.

If Expansion Joints 12b have been arranged equidistant and intended for the same External Face 16b (the same preferably applies for Expansion Joints 12a, 14a and 14b) at a distance of d to each other, the Offset V intended for the width direction between Expansion Joints 12a to External Face 16a and Expansion Joints 12b to External Face 16b will amount to half of the distance d.

The thickness of Expansion Joints 12a, 12b, 14a and 14b will preferably be greater than half of the Thickness D of the insulating element.

Expansion Joints 12a, 12b, 14a and 14b are limited to the shape depicted in FIG. 1. Expansion joints that are narrow with increasing thickness can also be conceived, whose cross-section, so to say, has a truncated conic shape.

Although Expansion Joints 12a, 12b, 14a and 14b will extend over the entire Length L and Width B of Insulating Element 10 according to FIG. 1, they can also suffice depending on the location of use, meaning the present geometry of the interior of the rail vehicle, when Expansion Joints 12a, 12b, 14a and 14b ultimately extend from External Face 18 starting over a pre-determined length and width area, meaning do not extend to an opposing External Face 18.

Furthermore, the number of Expansion Joints 12a, 12b, 14a and 14b will depend on the size and location of use of the Insulating element 10. Thereby, it can also suffice when only one expansion joint is intended for one external face, or respectively one expansion joint is intended for one opposing external face.

Insulating Element 10 according to the discovery will be made of closed-cell materials at least in part, preferably formed from a closed-cell foam material. As needed, this closed-cell form material can also be combined preferably with another material or preferably with other materials, thus with an open-pore, meaning non-closed-cell, melamine foam. The closed-cell foam material will be preferably be a closed-cell polyethylene form, or even more preferably a physically networked closed-cell polyethylene foam. The closed-cell polyethylene foam will preferably fulfill the DIN 5510-2 (S4, SR2 and ST2) and EN 45545-2 (R1, HL 2 and HL 3) fire standards and preferably be appropriate for the Air-conditioning Zones 2 and 3 specified by the European rail industry. Additional properties will result from the table below.

| Property | Method of Testing | Unit | Closed-cell Polyethylene Foam |
|---|---|---|---|
| Bulk Density | BS ISO 7214 1998 | kg/m3 | 15 |
| Cell size | Internal | mm | 0.90 |
| Pressure tension | BS ISO 7214 1998 | kPa | 18 |
| Shape changing characteristics 10% compression 50% compression | | kPa | 89 |
| Pressure warping balance 25% warp at 22 std. 23° C. 0.5 hr. relaxation 24 hr. relaxation | BS ISO 7214 1998 25 mm thickness | % DVR % DVR | 18 5 |
| Tensile strength | ISO 7214 1998 | kPa | 353 |
| Breaking stress | | % | 146 |
| Resistance to tearing | BS EN ISO 8067 1995 | N/m | 545 |
| Shore hardness OO scale 10 mm thickness without skin | ISO 868 1985 | OO | 26 |
| Maximum/minimum working temperature | Internal | ° C. | +95° C. −70° C. |
| Thermal conduction Tested at an avg. temperature of 10° C. | ISO 8302 1991 | W/mK | 0.039 |
| Fire inspection Rail | DIN 5510-2, S4, ST2, SR2, EN45545-2, HL2/HL3 | | |
| Heat expansion coefficient | Measurement Raw material with expansion system | WAK A in 10-6 K-1 A in 10-6 K-1 | 360 40 |
| Sheet dimensions (L × B) Thickness from 5 mm in steps of 1 mm to 100 mm raw measurement Block material (L × B × H) | 2,0000 mm × 1170 mm from 5 mm up to a max. of 100 mm Roughly 2050 mm × 1200 mm × 53 mm 2,0000 mm × 1170 mm × max. 300 mm | | |

The thermal insulating element can be fastened to the interior surfaces (floor, ceiling or wall) of the rail vehicle in a variety of manners and indeed to one depending on the location and to the other from the thickness of the insulating element.

The insulating element will preferably be adhered up to a thickness of 20 mm on one side and across its entire surface, in particular for its mounting on the ceilings and walls of the rail vehicle. For greater thicknesses, the insulating element will be fastened with the help of Fastening Agents 20 (FIG. 2). For this purpose, a self-boring and cutting anchor (22) will first preferably be mounted in the closed-cell foam material. A disc or sheet (26) will be placed in the attachment with External Face 16b of Insulating Element 10 by means of a screw (24), which will be screwed into Anchor 22. Sheet 26 will be fixed by tightening Screw 24. Adhesive will be placed on the open area of Sheet 26 and the insulating element will be bound to the interior surface of the wall and/or ceiling of the rail vehicle by means of the adhesive.

Depending on the size of Insulating Element 10, a multitude of such Fastening Agents 20 can be intended. Sheet 26 and Screw 26 will preferably be made of metal. This type of fastening has the advantage that Fastening Agent 20 can be intended as needed on any position desired of External Face 16a and 16b of Insulating Element 10. Even in areas, where Insulating Element 10 will be exposed to greater loads for use as intended and in the built-in state, Fastening Agents 20 can be intended with a greater open area in greater thicknesses and/or Sheet 26.

If, for example, the floor of the rail vehicle should be insulated, the insulating element that otherwise has the same material properties as an insulating element that would be mounted on a wall or ceiling of the rail vehicle cannot also have any expansion joints or fastening agents. Moreover, it is advantageous in this case when the insulating element has a drainage structure in its surface on the floor. This drainage structure will preferably have a number of heights and depths so that a wave-shaped structure will result thereby through which water can flow between the insulating element and the floor of the rail vehicle and drain out into a drain intended on the rail vehicle. The insulating element will preferably be placed loosely on a floor mounting in this case.

Insulating Element 10 with the Fastening Agents 20 intended in it will be cut as needed depending on the geometry of the interior of the rail vehicle and collected and packaged as an insulating kit. This will also apply for the insulating elements without fastening agents intended for floor mounting. Each Insulating Element 10 can thereby be labeled according to a pre-determined assembly diagram corresponding to the desired sequence of assembly. The insulating kits will preferably also be supplemented with a packing list and the corresponding assembly diagram.

The discoverer of this discovery has determined that a closed-cell material has an even thermal conductivity (and thereby insulating capability) and a highly stable shape thanks to its closed-cell structure. Thus, neither the absorption of moisture nor vibrations that arise while the rail vehicle is in operation will cause the material to slump. In addition, formation of bacteria potentially dangerous to health in the interior of the material and decomposition of the material potentially in connection with such will be prevented.

Certainly, the closed-cell material will contract and expand, in particular a foam material exposed to large temperature differences between the rail vehicle's exterior and interior, because the gas located in the cells will expand at higher temperatures and contract at lower temperatures. Thus, it has been determined, for example, that the dimensions of the closed-cell foam material can change by roughly 5 cm per meter given a temperature difference of 90° C. The same effect will arise when the humidity changes significantly as may occur during rail travel through high mountain altitudes. Expansion and contraction characterized as such can lead to massive damage to the rail vehicle. Thus, the metal exterior of the rail vehicle can be distended and thereby deformed, for example.

The expansion joints intended according to the discovery should thereby compensate for the expansion and contraction of the closed-cell material. For this reason, at least two expansion joints with a width of 2 to 3 mm, preferably 2 to 2.5 mm, should be intended for a length (or width) of insulating element of one meter.

Because preferably Expansion Joints 12a, 12b, 14a and 14b are intended for opposing External Faces 16a and 16b of Insulating Element 10 and the thickness will correspond to at least two Expansion Joints 12a and 12b preferably at least half of Thickness D (for varying thickness, Thickness D will correspond to the thickness of the insulating element in that area) of the insulating element, there will thereby not be any lines crossing the entire length or width of the insulating element, which will not cross at least one expansion joint. This in turn means that each layer section that is so thin (when one imagines that the entire insulting element has been constructed of a number of layer sections stacked in the direction of the thickness) can expand or contract so much that a significant bulge of one of the External Faces 16a or 16b will be avoided.

The expansion joints will also be even more advantageous in that the insulating element can better fit the bulged surface of the rail vehicle for mounting.

Furthermore, the fire protection will be improved because the entire interior surface of the rail vehicle will be evenly and permanently covered by an insulation that fulfills all of the prescribed fire standards.

If Fastening Agents 20 depicted in FIG. 2 are used for mounting the insulating element on the rail vehicle, a reliable and permanent connection of the insulating element with the rail vehicle can be achieved, because any contraction and expansion potentially occurring can be better compensated through the ultimately point fixation of the insulating element than by an adhesive over the entire surface. The insulating element will thus remain permanently connected even after several years of travel operation of the rail vehicle, whereby an even and permanent insulating capability will be guaranteed.

Because the expansion joints cross the external faces, the air located between the insulating element and the rail vehicle will be better able to escape when mounting the insulating element, which in turn will significantly simplify assembly.

An adhesive free of acrylic dispersion will preferably be used as adhesive. However, solid acrylic tape can also be used for thinner sheets. Thus, a closed-cell polyethylene foam will be resistant to such adhesives and the use of such an adhesive will lead to no damage of the closed-cell cell structure both with an adhesive covering the entire surface as well as with fastening by means of a fastening agent shown in FIG. 2.

The invention claimed is:

1. A thermal insulating element for the thermal insulation of a rail vehicle comprising a length, a width and a thickness, wherein the thermal insulating element has a top surface, a bottom surface opposite the top surface and a multiplicity of side surfaces; wherein the thickness extends between the top surface and the bottom surface; wherein the thermal insulating element is made of a closed-cell material and has a plurality of expansion joints on an external surface, and wherein the expansion joints are arranged in the shape of a grid, and wherein a first part of the expansion joints are arranged on a leading external surface and a second part of the expansion joints are arranged on a second external surface of the thermal insulating element, wherein the second external surface is opposite the leading external surface, and wherein at least a part of the first part or the second part of the expansion joints has a depth that is greater than half the thickness of the insulating element and wherein the joints extend into the top surface towards the bottom surface and also into the bottom surface towards the top surface in a manner such that the joints from the top and bottom are respectively offset at least partly with respect to each other by a distance V wherein V is equal to one half of a length between joints of the top or bottom surface.

2. The thermal insulating element of claim 1 wherein the expansion joints extend from a leading edge of the insulating element.

3. The thermal insulating element of claim 2 wherein the expansion joints extend from the leading edge to a second edge of the insulating element.

4. The thermal insulating element of claim 3 wherein at least part of the expansion joints extend over the entire length or width of the insulating element.

5. The thermal insulating element of claim 4 wherein the expansion joints are arranged equidistant to each other.

6. The thermal insulating element of claim 5 wherein the expansion joints cross each other.

7. The thermal insulating element of claim 1 wherein the closed-cell material is a closed-cell polyethylene foam.

8. The thermal insulating element of claim 7 wherein the closed-cell material is a physically networked closed-cell polyethylene foam.

9. The thermal insulating element of claim 8 further comprising at least one fastening agent connected with the closed-cell material.

10. The thermal insulating element of claim 9 wherein the fastening agent comprises a section anchored to a disc located in attachment with the external surfaces.

11. The thermal insulating element of claim 10 wherein the section comprises an anchor and a screw accepted in the anchor and wherein the disc is fixed by means of the screw to the external surface.

12. A method for mounting a thermal insulating element to an interior surface of a rail vehicle comprising the steps of providing a thermal insulating element comprising a closed-cell material, a length, a width and a thickness, wherein the thermal insulating element has a top surface, a bottom surface opposite the top surface and a multiplicity of side surfaces; wherein the thickness extends between the top surface and the bottom surface; wherein the thermal insulating element has a plurality of expansion joints on an external surface, and wherein the expansion joints are arranged in the shape of a grid, and wherein a first part of the expansion joints are arranged on a leading external surface and a second part of the expansion joints are arranged on a second external surface of the insulating element opposite the leading external surface, and wherein at least a part of the first part or the second part of the expansion joints has a depth that is greater than half the thickness of the insulating element, and mounting the insulating element on an interior surface of the rail vehicle and wherein the joints extend into the top surface towards the bottom surface and also into the bottom surface towards the top surface in a manner such that the joints from the top and bottom are respectively offset at least partly with respect to each other by a distance V wherein V is equal to one half of a length between joints of the top or bottom surface.

13. The method of claim 12 wherein a floor of the rail vehicle is covered with the thermal insulating element.

14. The method of claim 12 further comprising the step of mounting at least one fastening agent to the insulating element wherein an open surface of the fastening agent is essentially flush with an external surface of the insulating element.

15. The method of claim 14 further comprising the step of applying an adhesive to the open surface of the fastening agent.

* * * * *